(12) United States Patent
Hung et al.

(10) Patent No.: US 8,454,247 B2
(45) Date of Patent: Jun. 4, 2013

(54) LENS HOLDER AND IMAGE CAPTURE DEVICE USING SAME

(75) Inventors: Kuo-Chih Hung, New Taipei (TW); Hsueh-Chin Lu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 42 days.

(21) Appl. No.: 13/227,610

(22) Filed: Sep. 8, 2011

(65) Prior Publication Data

US 2012/0224843 A1 Sep. 6, 2012

(30) Foreign Application Priority Data

Mar. 4, 2011 (TW) .............................. 100107242 A

(51) Int. Cl.
*G03B 17/00* (2006.01)
(52) U.S. Cl.
USPC .......................................................... 396/428

(58) Field of Classification Search
USPC ............... 396/419, 427, 428, 529; 248/187.1; 348/373–376; 359/811, 819
See application file for complete search history.

(56) References Cited

U.S. PATENT DOCUMENTS

| | | | |
|---|---|---|---|
| 8,063,981 B2 * | 11/2011 | Hsieh et al. | 348/373 |
| 2002/0130230 A1 * | 9/2002 | Ursan et al. | 248/184.1 |
| 2010/0103540 A1 * | 4/2010 | An et al. | 359/819 |

* cited by examiner

*Primary Examiner* — W B Perkey
*Assistant Examiner* — Minh Phan
(74) *Attorney, Agent, or Firm* — Altis Law Group, Inc.

(57) ABSTRACT

An adaptive mounting for an image capture device includes a lens holder, a tilt bracket rotatably engaging with the lens holder, and a pan bracket pivotally connecting the tilt bracket via a pair of adjustment screws. The lens holder includes two opposite connecting portions used for engaging with either a vari-focus lens module or a fixed focus lens module.

16 Claims, 9 Drawing Sheets

LENS HOLDER AND IMAGE CAPTURE DEVICE USING SAME

BACKGROUND

1. Technical Field

The disclosure relates to image capture technologies, and particularly to a lens holder for an image capture device.

2. Description of Related Art

IP cameras usually employ a vari-focus lens module or a board lens module having a fixed focus. A lens holder for the board lens module usually includes an auxiliary structure (i.e., a sliding groove or a screw thread) for adjusting the position of the board lens module. However, the lens holder and auxiliary structure is not suitable for the vari-focus lens module, thus, the vari-focus lens module and the board lens module can not be assembled with the same type of lens holder. It's not convenient for the modular design of IP cameras.

Therefore, it is desirable to provide a lens module which can overcome the above-mentioned shortcomings.

BRIEF DESCRIPTION OF THE FIGURE

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
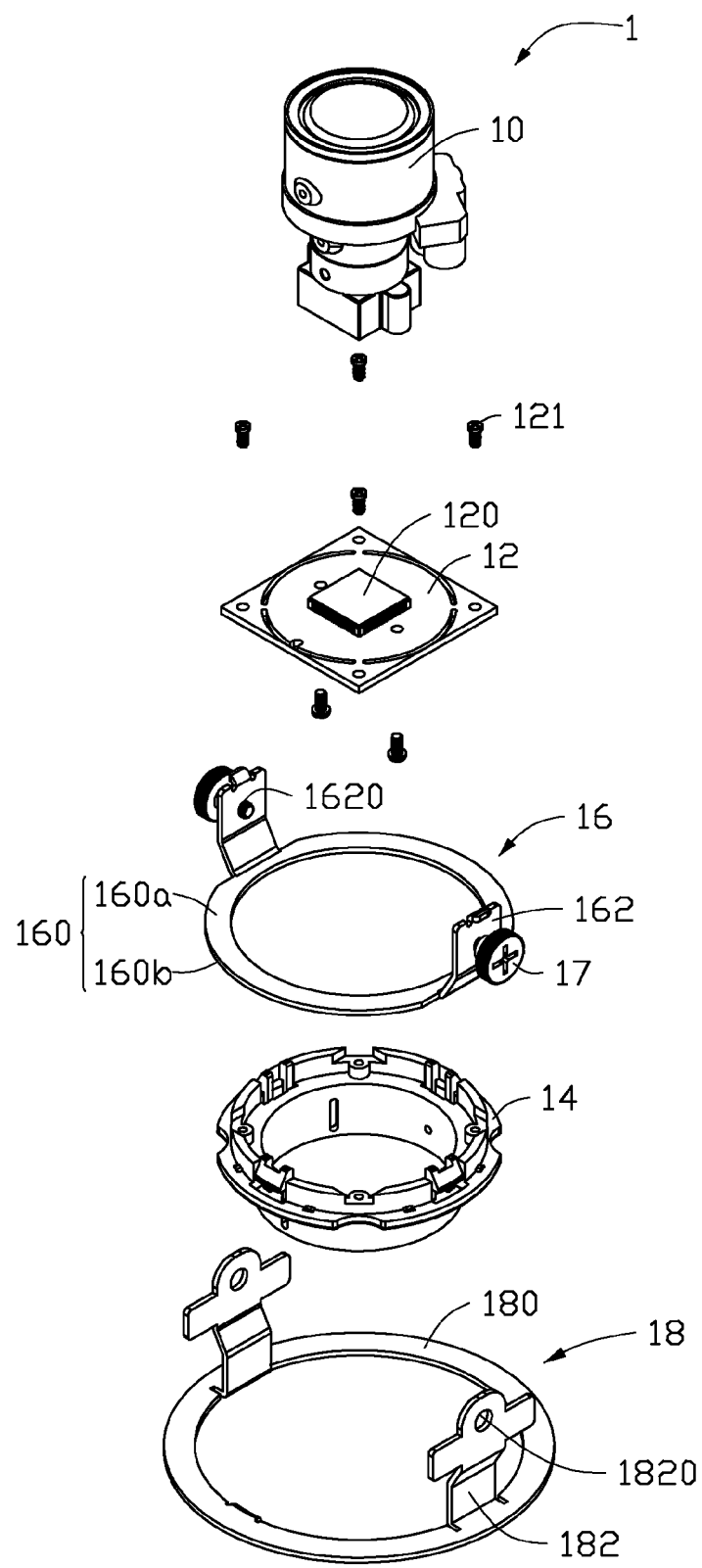
FIG. 1 is an exploded, isometric view of an image capture device in accordance with a first embodiment of the present disclosure.

Referring to FIG. 1, an image capture device 1, according to a first embodiment, includes a vari-focus lens module 10, a circuit board 12, a lens holder 14, a tilt bracket 16, and a pan bracket 18. The circuit board 12 includes an image sensor 120 fixed on the center of the circuit board 12. The vari-focus lens module 10 is located over the image sensor 120 and fixed on the circuit board 12 via a number of bolts 121. The lens holder 14 is rotatably held on the tilt bracket 16. The tilt bracket 16 is pivotally held on the pan bracket 18 via a number of adjustment screws 17.

The tilt bracket 16 includes a holding frame 160 and two connecting arms 162. The holding frame 160 is an annular plate and includes a top face 160a and a bottom face 160b. The two connecting arms 162 are diametrically opposite to each other and extend upward from the outer periphery of the top face 160a. Each connecting arm 162 is an elongated plate and defines a first connecting hole 1620 away from the holding frame 160.

The pan bracket 18 includes a support 180 and two holding arms 182. The support 180 is an annular plate. The two holding arms 182 are diametrically opposite to each other and extend upward from the inner wall of the support 180. Each holding arm 182 is an elongated plate and defines a second connecting hole 1820 spatially corresponding to the first connecting hole 1620.

Figure 2:
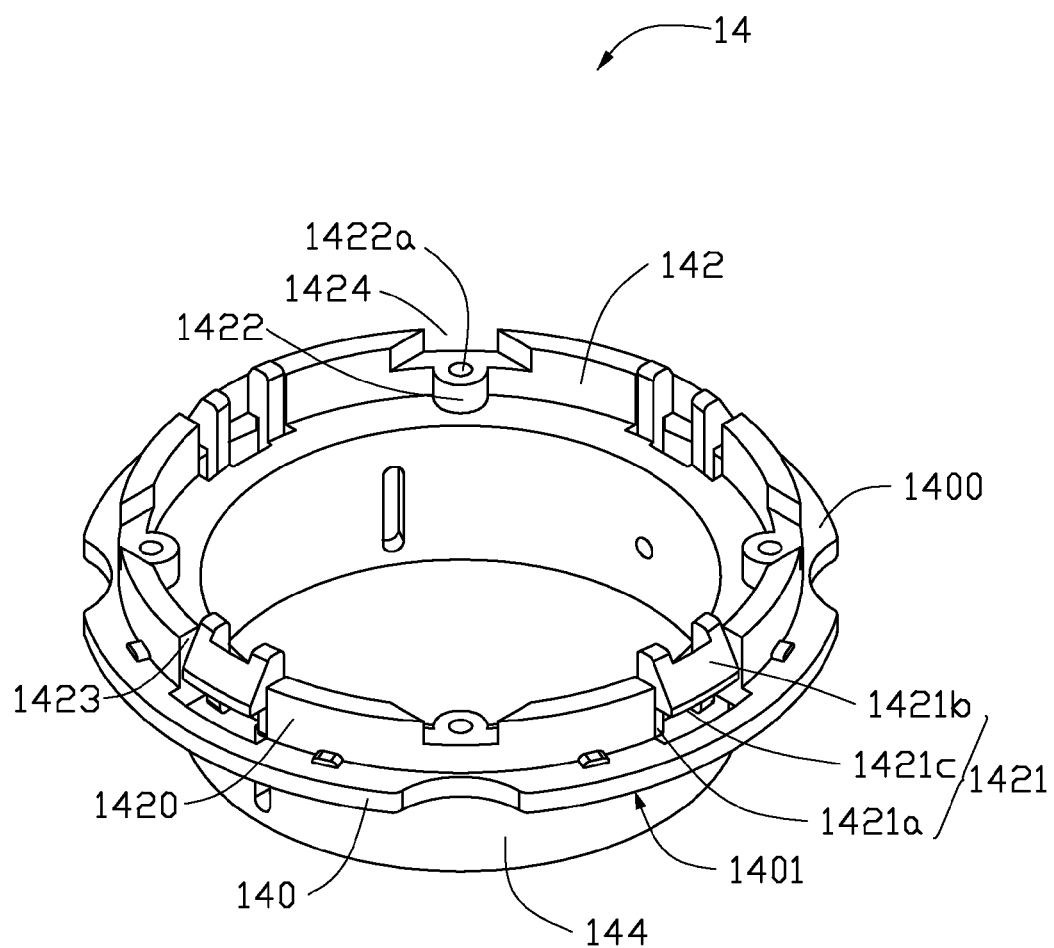
FIG. 2 is an isometric view showing a lens holder of the image capture device of FIG. 1.

Referring to FIG. 2, the lens holder 14 is made of resilient material and includes a base 140, a first connecting portion 142, and a second connecting portion 144. The base 140 is substantially an annular plate and includes a first surface 1400 and an opposite second surface 1401. The first connecting portion 142 is formed on the first surface 1400, and the second connecting portion 144 is formed on the second surface 1401 and coaxial with the first connecting portion 142.

The first connecting portion 142 includes a first side wall 1420, a number of securing structures 1421 and a number of fastening structures 1422. The first side wall 1420 is an annular wall substantially coaxial with the base 140. The first side wall 1420 extends perpendicularly from the first surface 1400. The inside diameter of the first side wall 1420 is larger than the inside diameter of the base 140. The outside diameter of the first side wall 1420 is substantially the same as the inside diameter of the holding frame 160. The first side wall 1420 defines a number of gaps 1423 which are equidistantly spaced, at a predetermined angle, around the circle represented by the side wall 1420. The securing structures 1421 are accommodated in the gaps 1423. In this embodiment, each securing structure 1421 is a hook and includes a pair of holding posts 1421a extending upwards from the first surface 1400 and a hooking protrusion 1421b extending outward from the distal ends of the holding posts 1421a. The hooking protrusion 1421b is shaped as a triangular prism and includes a contacting face 1421c parallel to the first surface 1400. The first side wall 1420 defines a number of cutouts 1424 away from the first surface 1400, with each cutout 1424 positioned between two adjacent gaps 1423. The fastening structures 1422 are formed on an inner surface of the first side wall 1420 just inside the cutouts 1424. In this embodiment, the fastening structures 1422 are a number of posts extending towards the center of the circle represented by the side wall 1420. Each post 1422 defines a threaded hole 1422a which is perpendicular to the first surface 1400.

Figure 3:
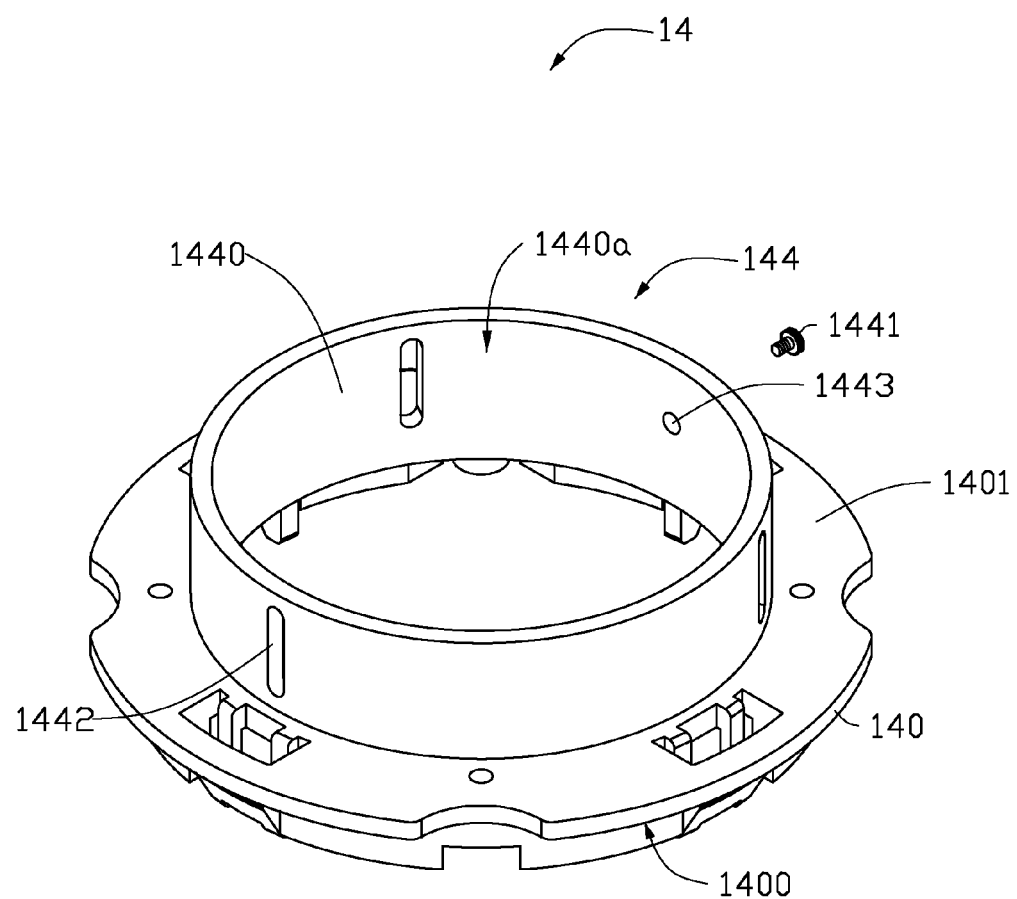
FIG. 3 is an isometric view of the lens holder of FIG. 2, viewed from another angle.
Figure 4:
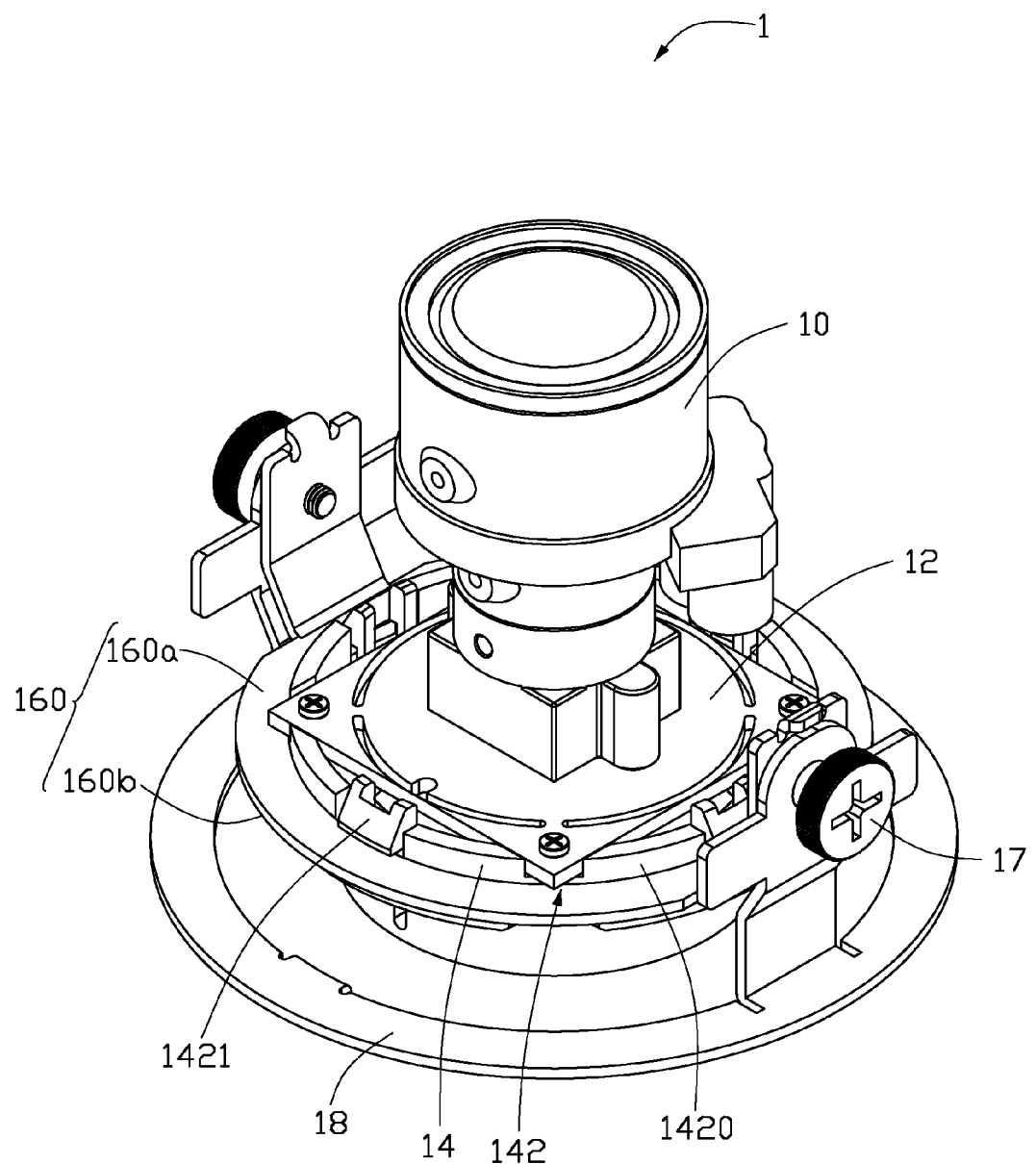
FIG. 4 is an isometric view of the assembled image capture device of FIG. 1.

Referring to FIG. 3, the second connecting portion 144 includes a second side wall 1440 and a position bolt 1441. The second side wall 1440 is an annular wall substantially coaxial with the base 140 and defines a receiving space 1440a. The second side wall 1440 perpendicularly extends outwards from the second surface 1401. The inside diameter of the second side wall 1440 is substantially the same as the inside diameter of the base 140. The second side wall 1440 includes a number of slots (sliding structures 1442) formed on the second side wall 1440. The second side wall 1440 defines a through hole 1443 between two of the sliding structures 1442. The through hole 1443 is configured to accept the position bolt 1441.

Referring to FIGS. 1-4, in assembly, the first connection portion 142 is inserted into the central part of the holding frame 160. The hooking protrusions 1421b latch on the inner wall of the holding frame 160 and the contacting face 1421c abuts the top face 160a of the holding frame 160. The corners of the circuit board 12 are received in the cutouts 1424. The circuit board 12 is fixed on the lens holder 14 by screwing the threaded bolts 121 into the threaded holes 1422a of the fastening structures 1422. The tilt bracket 16 is located between the holding arms 182. The connecting arms 162 are connected to the holding arms 182 by means of the adjustment screws 17 being inserted into the first and second connecting holes 1620, 1820. Therefore, the image capture device 1 can not only rotate axially, but can also swing around the axis of the first and second connecting holes 1620, 1820 for capturing images from a larger panorama.

Figure 5:
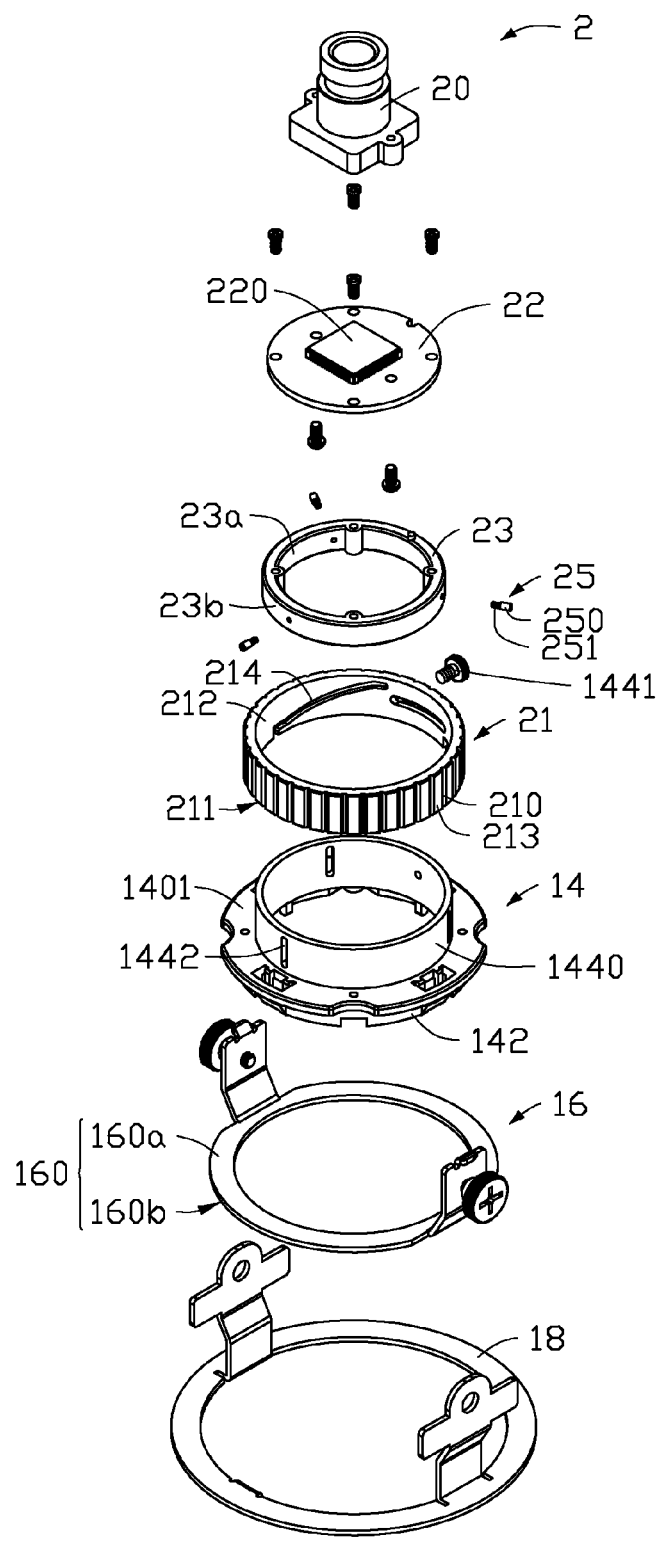
FIG. 5 is an exploded, isometric view of an image capture device in accordance with a second embodiment of the present disclosure.
Figure 6:
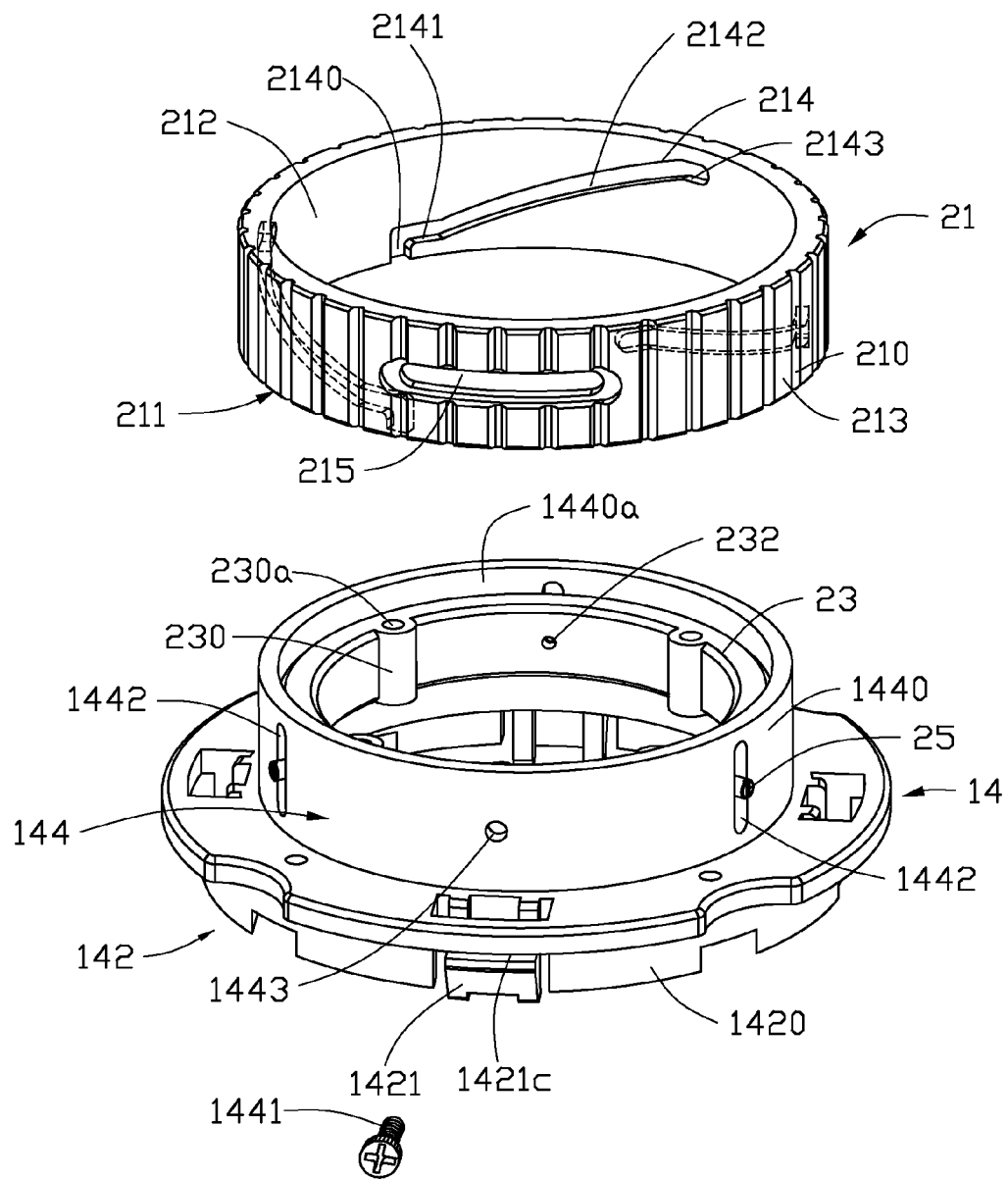
FIG. 6 is an isometric view showing a lens holder and an adjustment ring of the image capture device of FIG. 5.
Figure 7:
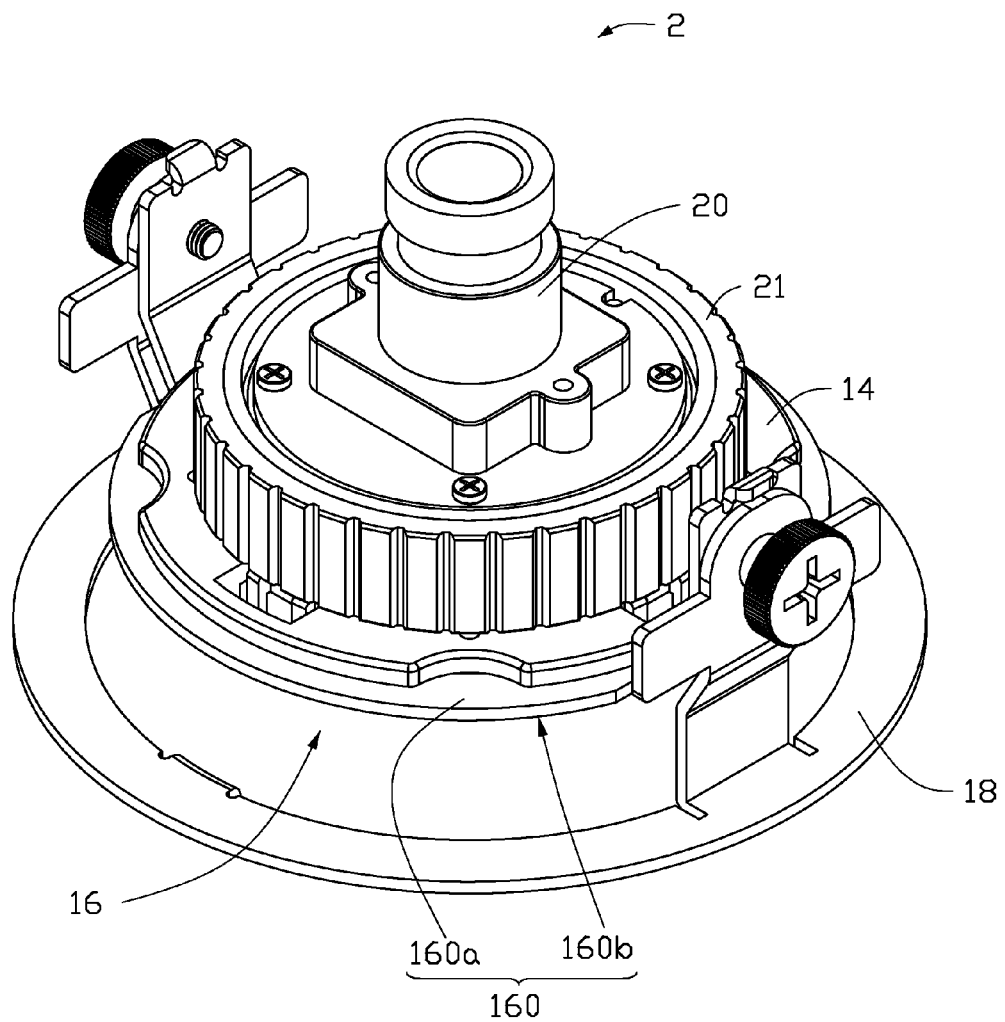
FIG. 7 is an isometric view of the assembled image capture device of FIG. 5.

Referring to FIGS. 5-7, an image capture device 2 in accordance with a second embodiment is similar to that of the first embodiment in structure and operation except that the varifocus lens module 10 is replaced with a board lens module 20 having a fixed focus. Therefore, the image capture device 2 of the second embodiment further includes an adjustment ring 21, a connecting loop 23, and a number of engaging pins 25 to implement the focusing operation of the board lens module 20.

The connecting loop 23 is annular, and can be received in the receiving space 1440a. The connecting loop 23 includes an inner surface 23a and an outer surface 23b. The inner surface 23a includes a number of connecting structures 230 formed on the inner surface 23a. In this embodiment, the connecting structures 230 are a number of posts extending towards the center of the connecting loop 23 from the inner surface 23a. Each post 230 defines a threaded hole 230a. The outer surface 23b defines a number of connecting through holes 232 corresponding to the sliding structures 1442 of the second connection portion 1440. The connecting through hole 232 is for the engaging pin 25 and may be a threaded hole. In this embodiment, the sliding structures 1442 are a number of elongated slots extending perpendicularly away from the second surface 2401. The slots 1442 are equidistantly defined on the second side wall 1440.

Each engaging pin 25 includes a body 250 and a connecting section 251. The body 250 extends out of the slot 1442 and can slide within it. The connecting section 251 is received in the connecting through hole 232 and may be threaded.

The inside diameter of the adjustment ring 21 is larger than the outside diameter of the second side wall 1440, therefore, the adjustment ring 21 can be sleeved around the second side wall 1440. The adjustment ring 21 has an inner surface 212, an outer side surface 210, and a bottom surface 211. The inner side surface 212 defines guiding grooves 214 corresponding to the engaging pins 25. Each guiding groove 214 substantially spirally extends from the bottom of the adjustment ring 21 towards the top of the adjustment ring 21 along the cylindrical inner side surface 212. The guiding groove 214 is formed to resemble a bayonet mounting and includes an access section 2140, a lead section 2141, a sliding section 2142 and a distal section 2143. The sliding section 2142 is inclined relative to the lead section 2141. Thus, the access section 2140 communicates with the bottom surface 211 of the adjustment ring 21 for guiding the body 250 of the engaging pin 25 to slide into the guiding groove 214. The lead section 2141 and the distal section 2143 are at least substantially parallel with the bottom surface 211 of the adjustment ring 21 for latching the body 250. The sliding section 2142 receives the body 250 and allows the engaging pin 25 to slide. The outer side surface 210 is fluted for a better grip by the user. The outer side surface 210 defines a stopping slot 215 circumferentially extending along the circumference of the adjustment ring 21 in a plane parallel with the bottom surface 211 of the adjustment ring 21. The stopping slot 215 extends through the circumference of the adjustment ring 21 to the inner side surface 212.

In assembly, the connecting loop 23 is received in the receiving space 1440a of the second side wall 2440. The slots 1442 align with the connecting through holes 232. The connecting section 251 of each engaging pin 25 passes through the slot 1442 and is received in the corresponding connecting through hole 232, with the body 250 of the engaging pin 25 extending outwardly from the slot 1442. Thus, the connecting loop 23 can only move up or down along the slots 1442 and cannot rotate relative to the second side wall 1440.

The adjustment ring 21 is sleeved around the second connecting portion 144, with each body 250 received in the corresponding guiding groove 214 from the corresponding access section 2140. The adjustment ring 21 can be rotated to align the through hole 1443 with the stopping slot 215. The position bolt 1441 passes through the stopping slot 215 and is screwed into the through hole 1443, therefore, the adjustment ring 21 cannot move up or down relative to the second side wall 1440 but can rotate as allowed by the stopping slot 215. The board lens module 20 is located over the image sensor 220 and fixed on the circuit board 22 via a number of bolts 121. The circuit board 22 is secured to the connecting loop 23 by screwing a number of threaded bolts 121 through the circuit board 22 and into the corresponding threaded holes 230a of the connecting structures 230. The first connecting portion 142 is inserted into the central part of the holding frame 160. The hooking protrusions 1421 latch on the inner wall of the holding frame 160 and the contacting face 1421c abuts the bottom surface 160b of the holding frame 160. Thus, the lens holder 14 with the board lens module 20 fixed thereon is slidably connected to the tilt bracket 16. The tilt bracket 16 and the pan bracket 18 assembly operation is similar to the first embodiment.

Figure 8:
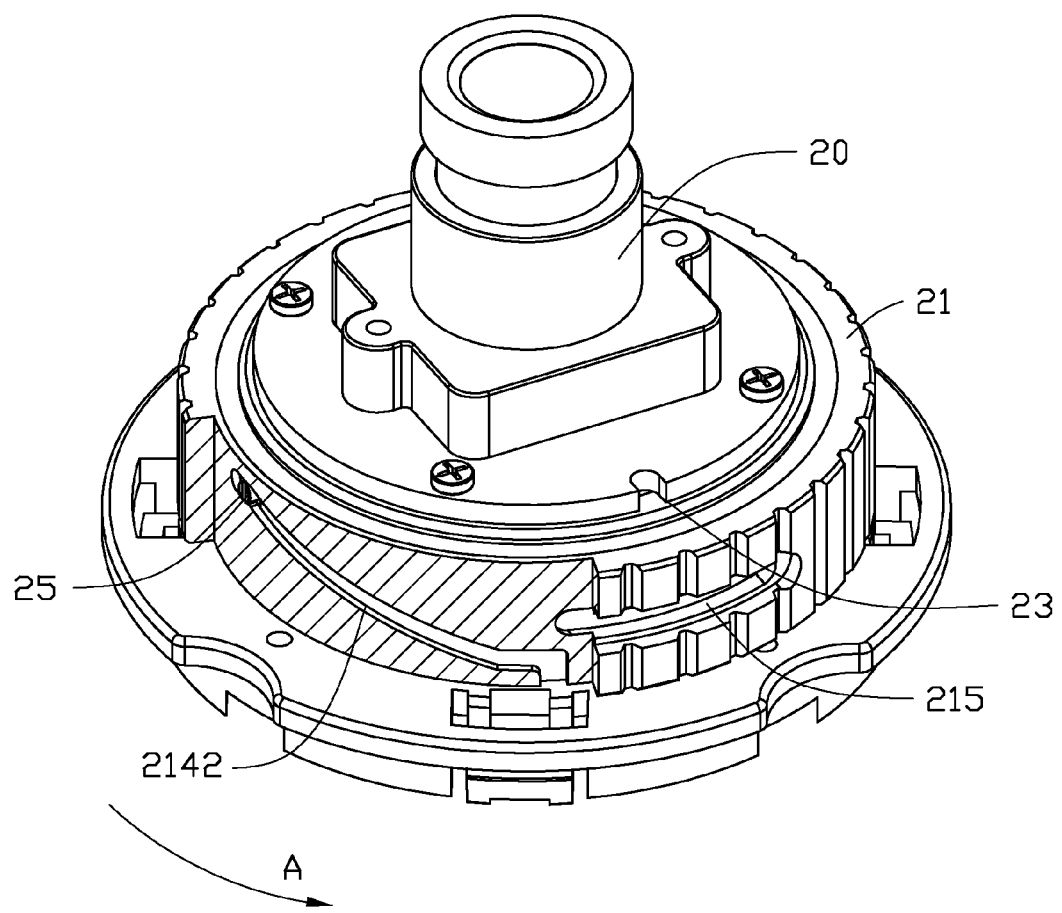
FIG. 8 is a cutaway view of the assembled image capture device of FIG. 5, when a board lens module is extended.
Figure 9:
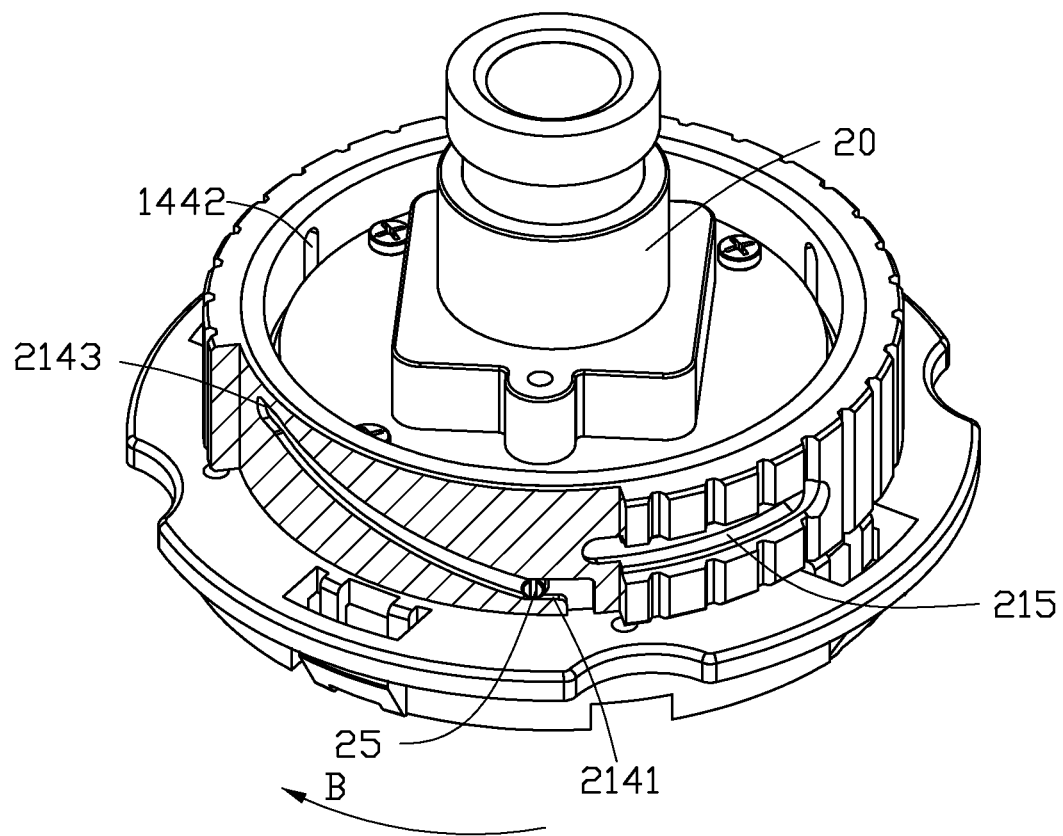
FIG. 9 is a cutaway view of the assembled image capture device of FIG. 5, when a board lens module is retracted.

Referring to FIGS. 8-9, to operate the board lens module 20, the adjustment ring 21 is rotated in direction A. The adjustment ring 21 is limited to rotate along the stopping slot 215, causing the body 250 of the engaging pin 25 to slide along the guiding groove 2142 from the lead section 2141 to the distal section 2143, vice versa. Thus, the engaging pins 25 drive the connecting loop 23 to move up and down along the slots 1442, while the bodies 250 slide in the sliding section 2142. The board lens module 20 is advanced outwards by the connecting loop 23 without rotating relative to the lens holder 14.

To retract the board lens module 20, the adjustment ring 21 is rotated along the direction B in reverse to the direction A. The engaging pins 25 drive the connecting loop 23 to retreat along the slots 1442, while the bodies 250 slide in the sliding section 2142. Thus, the board lens module 20 is retracted by the connecting loop 23. Therefore, the focusing operation of the board lens module 20 can be achieved by rotating the adjustment ring 21.

While various embodiments have been described, it is to be understood that the disclosure is not limited thereto. On the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A lens holder comprising:
   a base comprising a first surface and an opposite second surface parallel to the first surface;
   a first connecting portion positioned on the first surface and comprising an enclosed side wall, a plurality of securing structures for rotatably connecting an external support, and a plurality of fastening structures for fastening a first lens module; and a second connecting portion positioned on the opposite second surface and capable of slidably connecting with a second lens module;

wherein the securing structures are respectively formed in a plurality of gaps defined in the enclosed side wall, and the fastening structures are formed on an inner surface of the enclosed side wall.

2. The lens holder as claimed in claim 1, wherein the securing structures are a plurality of hooks arranged around the center of the base at a predetermined angle, each hook comprises a pair of holding posts extending outwards from the first surface and a hooking protrusion positioned at the distal ends of the holding posts.

3. The lens holder as claimed in claim 1, wherein the fastening structures are a plurality of posts, and each post is positioned between each two neighboring securing structures, extends uprightly from the first surface, and defines a threaded hole therein.

4. An image capture device comprising:
a lens holder comprising a base, a first connecting portion capable of connecting a first lens module, and a second connecting portion comprising an annular side wall defining a plurality of spaced slots and a through hole between two of the slots, the first and second connecting portions being correspondingly positioned on two opposite surfaces of the base;
a connecting loop being received in the annular side wall and defining a plurality of connecting through holes spatially corresponding to the slots;
a plurality of engaging pins, each engaging pin passing through a corresponding slot and screwed into a corresponding connecting through hole;
an adjustment ring comprising an inner surface, and defining a plurality of guiding grooves spirally extending from a bottom of the adjustment ring towards a top of the adjustment ring in the inner surface, and a stopping slot extending along the circumference of the adjustment ring, the adjustment ring being sleeved around the annular side wall with an end of each engaging pin inserted into a corresponding guiding groove;
a position bolt passing through the stopping slot and engaged in the through hole to prevent the adjustment ring from moving axially relative to the annular side wall;
a circuit board secured on a top of the connecting loop; and
a second lens module secured on the circuit board, wherein when the adjustment ring is rotated relative to the annular side wall, each engaging pin slides along the corresponding guiding groove and the corresponding slot to make the connecting loop, the circuit board and the second lens module move axially.

5. The image capture device as claimed in claim 4, further comprising a tilt bracket rotatably connected to the first connecting portion, wherein the tilt bracket comprises an annular holding frame and two connecting arms diametrically opposite to each other and extending upward from the outer periphery of the holding frame, and each connecting arm defines a first connecting hole away from the holding frame.

6. The image capture device as claimed in claim 5, further comprising a pan bracket pivotally connecting to the tilt bracket, wherein the pan bracket comprises a support and two holding arms diametrically opposite to each other and extending upward from an inner wall of the support, each holding arm defines a second connecting hole spatially corresponding to a respective one of the first connecting holes, and the tilt bracket is pivotally connected to the pan bracket by a pair of adjustment screws inserted into the first and second connecting holes.

7. The image capture device as claimed in claim 5, wherein the first connecting portion comprises a plurality of securing structures rotatably connecting the tilt bracket.

8. The image capture device as claimed in claim 7, wherein the securing structures are a plurality of hooks arranged around the center of the base at a predetermined angle, each hook comprises a pair of holding posts extending upwards from the base and a hooking protrusion positioned at the distal ends of the holding posts, the first connecting portion is inserted in a central part of the holding frame, and each hooking protrusion is latched on an inner wall of the holding frame.

9. The image capture device as claimed in claim 4, wherein the connecting loop further comprises an inner surface and a plurality of posts extending toward the center of the connecting loop from the inner surface, each post defines a threaded hole therein, the circuit board is secured onto the posts via a plurality of bolts inserted in the threaded holes of the posts.

10. The image capture device as claimed in claim 4, wherein each guiding groove comprises an access section, a lead section, a sliding section inclined relative to the lead section, and a distal section, the access section communicates with the bottom of the adjustment ring, the lead section is positioned between the access section and the sliding section, the distal section is connected with the sliding section, and the lead section and the distal section are substantially parallel with the bottom of the adjustment ring.

11. The image capture device as claimed in claim 4, wherein the first lens module is capable of varying focus, and the second lens module is a board lens module having a fixed focus.

12. The image capture device as claimed in claim 4, wherein the slots are elongated shaped and extend along directions perpendicular to the base.

13. An image capture device comprising:
a first lens module;
a circuit board supporting the first lens module;
a lens holder comprising a base, a first connecting portion, and an opposite second connecting portion capable of slidably connecting a second lens module, wherein the first and second connecting portions are coaxially positioned on two opposite surfaces of the base, the first connecting portion comprises a plurality of fastening structures fastening the circuit board and a plurality of securing structures; and
a tilt bracket rotatably connected to the securing structures, wherein the tilt bracket comprises an annular holding frame and two connecting arms diametrically opposite to each other and extending upward from the outer periphery of the holding frame, and each connecting arm defines a first connecting hole away from the holding frame;
wherein the securing structures are a plurality of hooks arranged around the center of the base at a predetermined angle, each hook comprises a pair of holding posts extending upwards from the base and a hooking protrusion positioned at the distal ends of the holding posts, the first connecting portion is inserted in a central part of the holding frame, and each hooking protrusion is latched on an inner wall of the holding frame.

14. The image capture device as claimed in claim 13, further comprising a pan bracket pivotally connecting to the tilt bracket, wherein the pan bracket comprises a support and two holding arms diametrically opposite to each other and extending upward from an inner wall of the support, each holding arm defines a second connecting hole spatially corresponding to a respective one of the first connecting holes, and the tilt bracket is pivotally connected to the pan bracket by a pair of adjustment screws inserted into the first and second connecting holes.

15. The image capture device as claimed in claim 13, wherein the fastening structures are a plurality of posts, each post is positioned between each two neighboring securing structures, extends uprightly from the first surface, and defines a threaded hole therein, and the circuit board is fixed on the lens holder by a plurality of bolts screwed through the circuit board and into the corresponding threaded holes.

16. The image capture device as claimed in claim 13, wherein the first lens module is capable of varying focus, and the second lens module is a board lens module having a fixed focus.

* * * * *